Patented Mar. 21, 1939

2,151,167

UNITED STATES PATENT OFFICE 2,151,167

PROCESS OF TREATING COLLOIDAL HYDROCARBONS

Eulampiu Slatineanu, Oberhausen, Germany, assignor to Gewerkschaft Auguste, Oberhausen, Germany, a company of Germany No Drawing. Application February 20, 1937, Serial No. 126,838. In Germany April 26, 1935

9 Claims. (Cl. 260—666)

This application is a continuation in part of my copending application for Letters Patent Serial No. 75,250 filed April 18, 1936, for "Process of treating carbon or carbonaceous compounds".

My invention relates to the heat treatment of colloidal hydrocarbons for the production of valuable products of various kinds.

It is an object of my invention to produce valuable products and more especially hydrocarbons from colloidal hydrocarbons such as caoutchouc, gutta-percha and balata.

My invention has particular reference to the production of valuable compounds from carbonaceous materials by the action, at an elevated temperature and under high pressure, of methane.

My invention is based on the discovery that dipol-free molecules, when acted upon by high pressure, i. e. when the electron shells are compressed, can be polarized, so that under sufficiently high pressure the methane molecule, in contrast to all that could be expected, is no longer an indifferent, but a highly reactive compound. In principle the process according to my invention thus consists in that methane or a gas mixture which contains methane is caused to act upon colloidal hydrocarbons, such as caoutchouc, gutta-percha or balata and like substances, under a pressure which is sufficient to cause a polarization of the methane present in the reaction mixture. As a rule pressures of or above 500 atmospheres are employed.

The total pressure required in the new process amounts as a rule to 500 atmospheres as a minimum. If, however, ethylene or acetylene or a mixture of ethylene and acetylene is present in the gas mixture in a quantity amounting to about 20 per cent or more by volume, a pressure of about 250 atmospheres may be sufficient to render the methane highly reactive in the sense explained above. I have ascertained that under the action of this high pressure the methane will not only prevent $CH_4$ from being split off from the compounds treated, but will even cause $CH_4$ to combine with the starting material or with the fragments, into which these materials are split, condensation taking place simultaneously in certain cases. This combination may also occur simultaneously with a splitting of the carbon chain.

In many cases I prefer to choose the partial pressure of the methane far higher than the sum of the partial pressures of the gaseous compounds reacted with it.

In contradistinction to prior art processes a reaction temperature of 390° C. need not be overstepped, whereby the control of the operation is facilitated and the apparatus rendered simpler and less expensive.

The temperature limit, above which the desired reactions do not proceed any more with satisfactory yield, can be determined by means of the thermodynamic formulae of the free energies calculated for instance according to the method of Lewis and Randall. The notation used by these authors, for instance in "Thermodynamics" (as published in 1923 by McGraw and Hill) will be used herein. In certain cases, defined by the well known phase rule, the same is true of the limits of the molecular proportions of the reacting materials. I have found it advantageous as far as the yield is concerned, to determine the reaction temperature and the molecular proportions in such manner that under the operating conditions the free energies of the reactions intended to take place correspond to a value, which (if expressed according to Lewis and Randall does not exceed +5000 gcal. (gram calories) per mol of hydrocarbon produced; this value may be negative. At a predetermined temperature the free energies are always equal to the expression:

$$-RT \ln K = DF$$

(D here stands for $\Delta$).

$DF$ corresponds to a figure ranging between $x$ and $+5000$ gcal.

If R is the gas constant, T the absolute temperature, $\ln$ Napier's logarithm, K the equilibrium constant, the formula, if Brigg's logarithm is used, will be $$-4.5753 \, T \cdot \log K = DF$$

From the constant K the total pressure can be computed according to the law of mass action as the sum of the partial pressures of the components of the equilibrium.

From the formula there thus results that the partial pressures of the components formed and simultaneously the yield rise, as the partial pressure of the methane rises. The rising pressure of the methane also favors the conversion of the free carbon, which may be present, into a non-solid phase.

The reaction may also be furthered and accelerated by adding suitable catalysts. However, in view of the high pressure the presence of catalysts is not necessary.

If the process is for instance applied to unsaturated hydrocarbon compounds, mainly a combination of methane takes place, accompanied by condensation, for instance according to the equation $$C_2H_2+CH_4+C_5H_{12}\rightarrow C_8H_{18}$$

However the reaction may also be so conducted that at the same time the starting material, or constituents of the same, is or are split up into lower molecular compounds, for instance according to the equation $$C_2H_2+2CH_4+C_{12}H_{26}\rightarrow 2C_8H_{18}$$

Instead of methane also gas mixtures containing methane may be used; obviously the partial pressure of the methane in the system must be kept correspondingly high.

If the methane or the gas mixture containing same also contain about 20% by volume or more ethylene or acetylene or a mixture of ethylene and acetylene, the operation may also be carried through under a pressure of less than 500 and sometimes even down to 250 atmospheres. For similarly as carbon monoxide (CO) such unsaturated hydrocarbons are unstable molecules and the reaction is therefore not only stimulated by the pressure, but also by the potential energy of the unsaturated molecules.

In many cases it has been found advantageous to cause the reaction to take place in a heterogeneous system, i. e. in such manner that at least one of the reaction components already present or the final products formed remains liquid under the operating pressure.

The cleavage products (fragments) such as methane and its homologues, hydrogen, ethylene and its homologues, carbon monoxide, acetylene and its homologues, naphthalene, other tar constituents and solid carbon, which are formed in the hitherto known processes of conversion of carbonaceous materials, are not stable under the conditions of operation of the present process, but will react according to the following equations with the formation of liquid hydrocarbons:

1. $14CO+9CH_4\rightleftarrows 2C_8H_{18}+7CO_2$
2. $7CO+9CH_4+7H_2\rightleftarrows 2C_8H_{18}+7H_2O$
3. $7C_2H_4+2CH_4\rightleftarrows 2C_8H_{18}$
4. $7C_2H_2+10CH_4\rightleftarrows 3C_8H_{18}$
5. $C_{10}H_8+C_2H_4\rightleftarrows 2C_6H_6$
6. $C_{10}H_8+2C_2H_4\rightleftarrows 2C_7H_8$
7. $C_{10}H_8+C_2H_2+CH_4\rightleftarrows C_6H_6+C_7H_8$
8. $6C_2H_4+3CH_4+C\rightleftarrows 2C_8H_{18}$
9. $5C_2H_4+4CH_4+2C\rightleftarrows 2C_8H_{18}$
10. $7C_2H_4+4CH_4+5C\rightleftarrows 2C_8H_{18}+C_7H_8$
11. $7C_2H_2+19CH_4+7C\rightleftarrows 5C_8H_{18}$
12. $7C_2H_2+13CH_4+9C\rightleftarrows 3C_8H_{18}+2C_6H_6$
13. $7C_2H_2+12CH_4+5C\rightleftarrows 3C_8H_{18}+C_7H_8$ In these equations only representatives of the different groups (paraffines, olefines, acetylene, naphthenes, naphthalenes etc.) are shown. The reactions will occur in a similar manner with their homologues or derivatives. Obviously, each of these reactions can be carried out singly or a plurality of such reactions may be carried through in combination.

According to the laws of thermodynamics carbon may be formed in different ways when carrying through these processes. It need not be separated from a solid phase, but may also be formed for instance from carbon monoxide according to the equation:

$$2CO=CO_2+C$$

If the gaseous phase contains hydrogen, the equilibrium $$CO+H_2=H_2O+C$$

may also play a rôle.

Under the operating conditions the carbon thus separated will react with the higher molecular carbon compounds and also with the methane.

If carbon monoxide and hydrogen are present, the new process may also be explained thermodynamically in such manner that primarily the reaction $$CO+2H_2=CH_3OH$$

occurs and that thereafter the alcohol reacts with methane alone or with higher molecular organic carbon compounds and methane for instance according to the equation:

$$CH_3OH+C_nH_{2n+2}=C_{n+1}H_{2n+4}+H_2O$$

These theoretical considerations were subjected to practical laboratory tests and it was found that under the conditions of this invention alcohols of any kind will in fact react with methane alone or with higher molecular organic carbon compounds and methane for instance as follows $$C_nH_{2n+1}OH+C_nH_{2n+2}=C_{2n}H_{4n+2}+H_2O$$

Unsaturated hydrocarbons also have the tendency of separating carbon from the gaseous phase, for instance as follows:

(a) $\qquad C_2H_4=CH_4+C$
(b) $\qquad 2C_2H_2=CH_4+3C$

In view of thermodynamic calculations the reaction between carbon monoxide and methane may also proceed by way of ethylene as follows $$2CO+CH_4=C_2H_4+CO_2$$

The ethylene will then however be decomposed again according to the Equation a. Consequently in this or similar reactions special provision must be made for preventing the separation of carbon.

This separation can be prevented by any one of the following steps:

(1) The partial pressure of the methane must exceed by far the partial pressure of the gaseous component to be reacted with methane;
(2) The reactions must proceed in a system which under the conditions of operation contains at least one liquid phase. This liquid phase may be added in the form of a suitable hydrocarbon, for instance paraffine oil.

These two steps may also be used in combination in order to prevent the separation of carbon. In this case the system contains a liquid phase and the partial pressure of the methane exceeds by far the sum of the partial pressures of the gaseous components to be reacted with methane.

For thermodynamic reasons carbon does not react with methane directly from a solid phase.

It has already been pointed out farther above that the reactions proceed more readily, more completely, and in a more easily regulatable manner, if at least one liquid phase is present. Therefore one of the equilibrium components—either of the starting materials or of the products formed in the reaction—shall be liquid under the conditions of reaction. In the reactions mentioned above water will always appear as a component, since the plurality of these reactions proceed below the critical point of water, and therefore the liquid phase is here already present in the form of water. One may however also provide the liquid phase by injecting into the reaction chamber, besides the reaction components to be reacted in the first place also substances which remain liquid under the reaction conditions, such as for instance paraffines, paraffine oil, vaselines, tar oils etc. This addition is particularly useful in the case of reaction components having a tendency to separate out low molecular paraffines. In such case heavier paraffines added to the mixture will react with the light paraffines formed and will act towards carrying the reaction to completion within a technically admissible period of reaction.

In practising this invention one may proceed for instance as follows:

*Example*

Caoutchouc is allowed to swell in a high-boiling petroleum fraction. The swollen mass is treated at 350° C. and under a pressure of 900 atm. in the presence of a catalyst, composed of a reduced molybdate of iron and zinc chloride, with a gas mixture consisting of 80 per cent by volume methane and 20 per cent hydrogen. By this treatment the caoutchouc is converted into low-boiling benzine-hydrocarbons. From 1000 parts by weight caoutchouc 1200 parts hydrocarbons may be obtained.

The process may be carried through in an apparatus of the kind used for high pressure reactions, for instance in a hydrogenation apparatus as used in the Bergius-process.

Various changes may be made in the details disclosed in the foregoing specification without departing from the invention or sacrificing the advantages thereof.

I claim:—

1. The process of converting colloidal hydrocarbons into other, valuable products, which comprises acting upon a colloidal hydrocarbon in the presence of a liquid phase at an elevated temperature not exceeding 390° C. with a gas mixture, which contains a substantial proportion of methane, under a total pressure of at least 500 atmospheres above normal and a partial pressure of methane which suffices to cause a polarization of the methane present.

2. The process of converting caoutchouc into other valuable products which comprises acting upon caoutchouc in the presence of a liquid phase at an elevated temperature not exceeding 390° C. with a gas mixture, which contains a substantial proportion of methane, under a total pressure of at least 500 atmospheres above normal and a partial pressure of methane which suffices to cause a polarization of the methane present.

3. The process of converting colloidal hydrocarbons into other, valuable products, which comprises acting upon a colloidal hydrocarbon in the presence of a liquid phase at an elevated temperature not exceeding 390° C. with a gas mixture, which contains a substantial proportion of methane, under so high a pressure that the partial pressure of the methane amounts to at least 500 atmospheres.

4. The process of claim 1, in which the treatment is effected in a heterogeneous system, at least one liquid phase participating in the reaction.

5. The process of claim 1, in which the treatment is effected in a heterogeneous system, at least one liquid phase being formed by an added substance which is liquid under the conditions of the reaction.

6. The process of claim 1, in which the partial pressure of the methane is chosen far higher than the sum of the partial pressures of the gaseous compounds reacted with it.

7. The process of converting colloidal hydrocarbons into other, valuable products, which comprises acting upon a colloidal hydrocarbon in the presence of a liquid phase at an elevated temperature, not exceeding 390° C. with a gas mixture, which contains a substantial proportion of methane and more than 20 per cent by volume ethylene, under a pressure of at least 250 atmospheres which suffices to cause a polarization of the methane present.

8. The process of converting colloidal hydrocarbons into other, valuable products, which comprises acting upon a colloidal hydrocarbon in the presence of a liquid phase at an elevated temperature, not exceeding 390° C., with a gas mixture, which contains a substantial proportion of methane and more than 20 per cent by volume acetylene, under a pressure of at least 250 atmospheres which suffices to cause a polarization of the methane present.

9. The process of converting colloidal hydrocarbons into other, valuable products, which comprises acting upon a colloidal hydrocarbon in the presence of a liquid phase at an elevated temperature, not exceeding 390° C., with a gas mixture, which contains a substantial proportion of methane and more than 20 per cent by volume ethylene and acetylene, under a pressure of at least 250 atmospheres which suffices to cause a polarization of the methane present.

EULAMPIU SLATINEANU.